Dec. 26, 1939.　　　　V. GLANZ　　　　2,184,641
STEREOSCOPIC MOVING PICTURE APPARATUS
Filed April 5, 1938　　　3 Sheets-Sheet 1
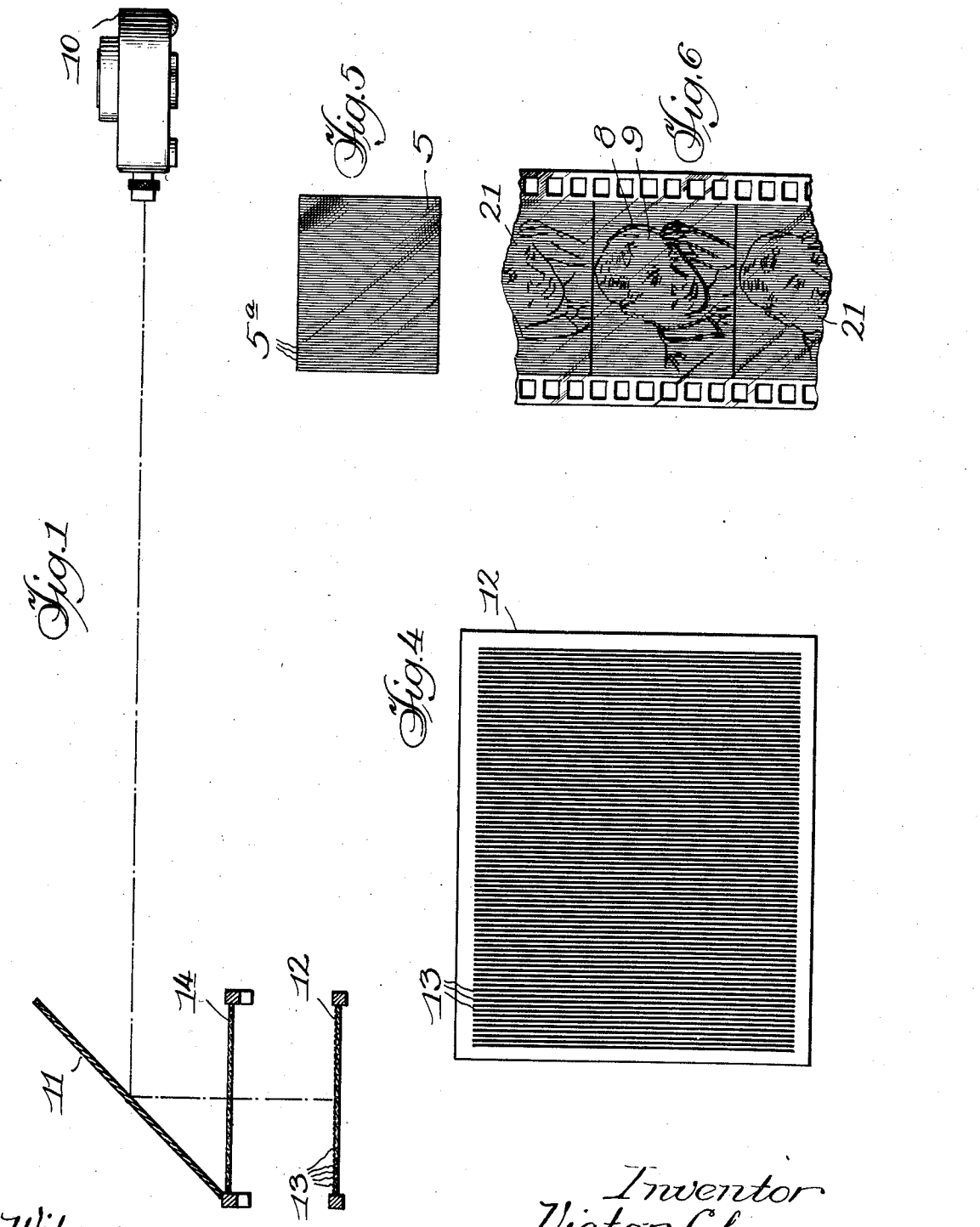
Inventor
Victor Glanz Dec. 26, 1939. V. GLANZ 2,184,641
STEREOSCOPIC MOVING PICTURE APPARATUS
Filed April 5, 1938 3 Sheets-Sheet 2
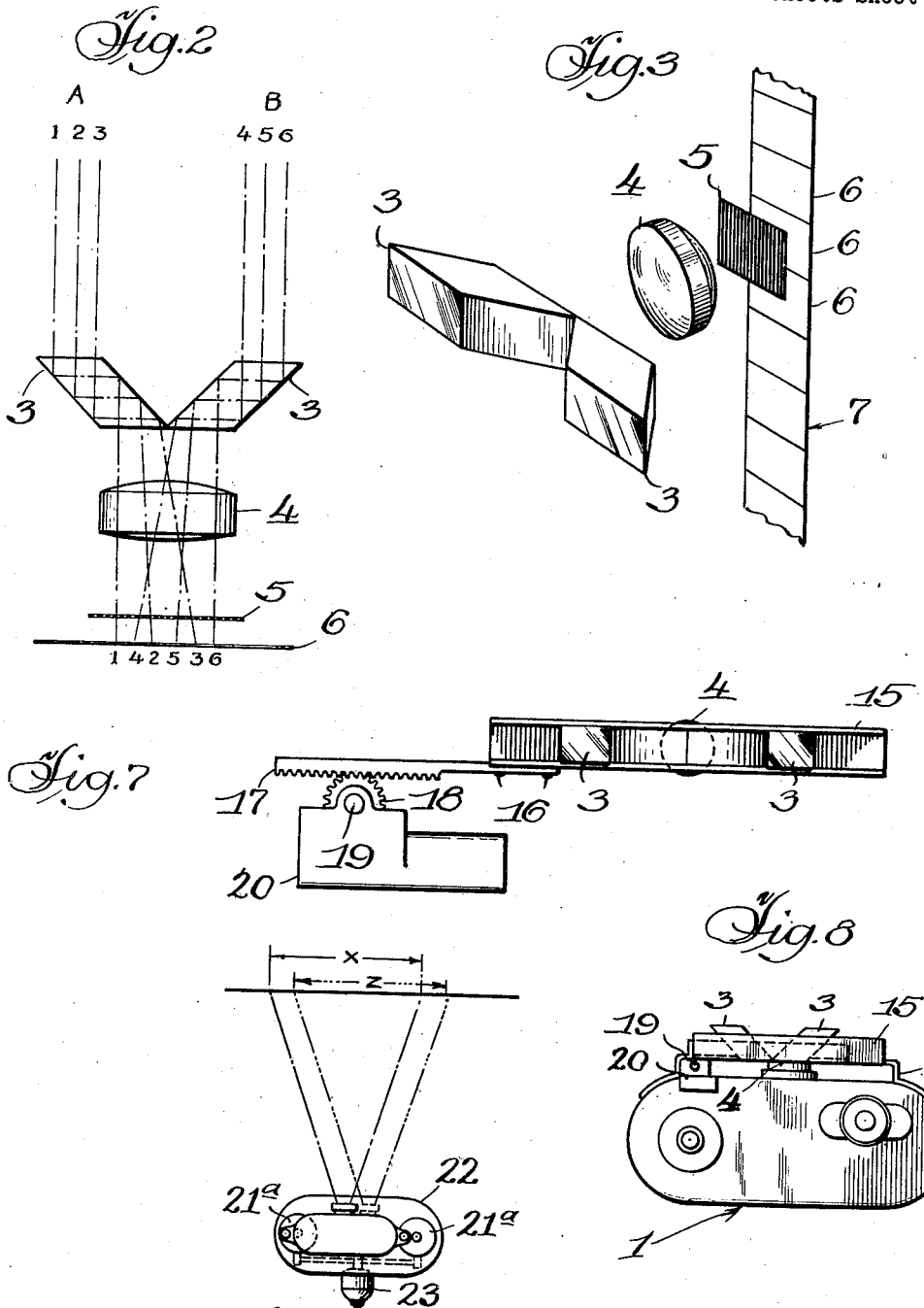
Inventor,
Victor Glanz Dec. 26, 1939.  V. GLANZ  2,184,641
STEREOSCOPIC MOVING PICTURE APPARATUS
Filed April 5, 1938   3 Sheets-Sheet 3
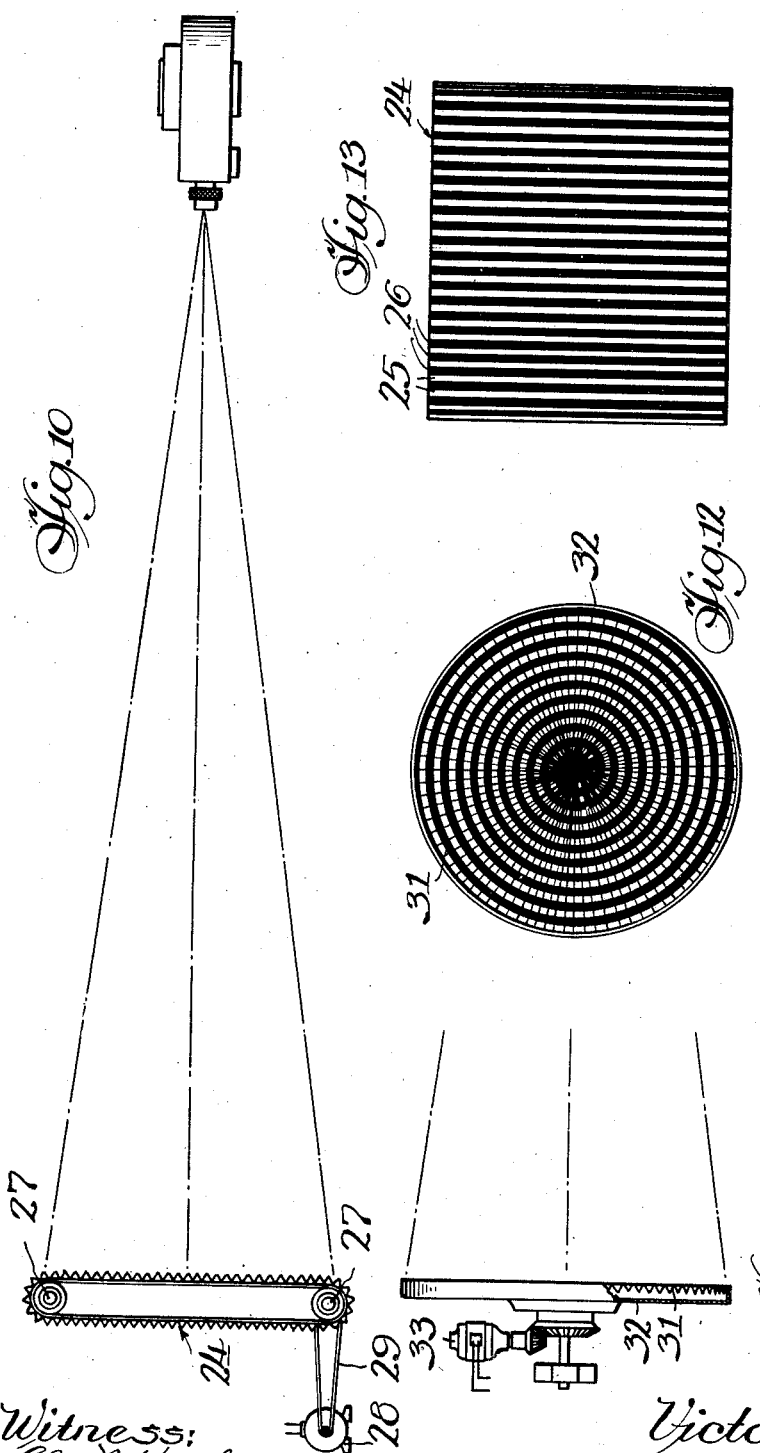

Patented Dec. 26, 1939

2,184,641

UNITED STATES PATENT OFFICE 2,184,641

STEREOSCOPIC MOVING PICTURE APPARATUS

Victor Glanz, Chicago, Ill.

Application April 5, 1938, Serial No. 200,160

5 Claims. (Cl. 88—16.6)

My invention relates to a stereoscopic moving picture apparatus and more particularly to a novel camera for taking moving pictures and a novel screen which, when used with the usual projector, will give a stereoscopic or relief effect.

Heretofore it has been thought necessary to have a movable camera for taking such pictures. The camera has been made movable with respect to the object to be photographed and in addition means were provided for cutting off some of the rays of light entering the camera. One of such devices is shown in my patent, No. 2,111,065, issued March 15, 1938.

I have discovered, however, that it is not necessary to move the camera when means are provided for breaking up or filtering the rays of light entering the camera lens and when spaced means are provided in front of the camera for intercepting and transmitting to the lens different rays which correspond to the rays which would enter a person's eyes were he viewing the object being photographed.

My invention comprises four elements; (1) a patterned screen, either movable or stationary; (2) movable or stationary prisms or other light reflecting and transmitting means in front of the camera lens and preferably spaced apart about two and one-half inches (the normal distance between a person's eyes); (3) a movable or stationary light dispersing filter between the camera lens and the film and having a pattern exactly corresponding to the pattern of the screen (1); and (4) the usual moving picture camera to which the above prisms and filter are attached.

When the prisms are stationary the camera takes two distinct pictures on each exposure of the film, the pictures being partially superimposed, with one slightly to one side of the other. I have also had excellent results from placing the prisms next to each other and moving them in timed relationship to the movement of the film, as for example, four times back and forth a second, compared to the sixteen exposures per second of the film. With such a movement the first exposure will receive the rays from the right prism only, the second from both prisms, the third from the left prism only, the fourth from both, etc. It is understood the above is illustrative only and that other timing relationships may be used.

An ordinary projector is used to throw the picture of the film on the screen. As the pattern of the filter and screen are identical the pattern of the film or picture will coincide with the pattern on the screen. This results, when thrown on the screen in a manner to be described, in making the pattern on the screen seem to disappear and in giving a stereoscopic or relief effect.

I have found that the best results are obtained when the lines or pattern on the screen are the same width as the spaces between the lines but do not confine my invention to this relationship. Excellent results have been obtained when the lines are twice and one and one-half times the width of the spaces therebetween. Instead of lines one may use other geometric forms such as circles, triangles, squares, etc., just so the pattern of the filter and screen are the same.

In throwing the picture on the screen I have found that good results are obtained by placing the projector behind and to one side of the screen and directing the projector in a line parallel to the plane of the screen and the picture projected upon a mirror arranged at an angle of approximately 45° with respect to the projector and the screen, as more clearly shown in Fig. 1, so that the picture is reflected from the mirror onto the screen. A pane of ground glass, a sheet or other translucent or opaque material is placed between the mirror and screen to hold the picture in its natural or proper place or position on the screen to eliminate glare from the projector, etc. It is also possible to eliminate the mirror and replace it by the ground glass or sheet which will reflect or cast the picture on the screen.

Another means of throwing the picture on the screen to get the stereoscopic effect is to provide a corrugated screen the corrugations of which project at an angle of approximately 45° to the plane of the screen, and which screen is rotated or moved backward and forward or continuously in one direction after the manner of an endless belt. The projector in this case is in front of the screen. This movement, like the arrangement of the projector behind the screen, serves to make the pattern on the screen appear to vanish or disappear and gives a stereoscopic or relief effect to the audience.

The advantages of the first arrangement is that the screen is stationary. But the camera must be behind and to one side of the screen. If the picture is thrown directly on the screen from the present projector booths, the lines or pattern appear too strongly and mar the effect. With the movable corrugated screen the picture is projected from the front and the present equipment used but the corrugated screen must be moved.

Other objects, advantages and capabilities are comprehended by the invention as will more fully appear and as are inherently possesed thereby.

In the drawings:

Fig. 1 is a top plan view showing the projector in position to throw a picture taken with my novel camera on a screen.

Fig. 2 is a plan view showing how the rays of light from an object are reflected onto the film.

Fig. 3 is a perspective view of the novel parts used with the usual camera and in substantially the desired relationship.

Fig. 4 is a front or elevational view of my novel screen.

Fig. 5 is a view in elevation of my filter plate.

Fig. 6 is a fragmentary front view of a strip of film run through my camera.

Fig. 7 is a plan view of a mechanism for reciprocating the prisms in front of the lens.

Fig. 8 is a plan view of a camera with an extension housing the device shown in Fig. 7.

Fig. 9 is another alternate construction using my novel filter but in which the camera moves in a circular path with the prisms eliminated.

Fig. 10 is a top plan view of a movable corrugated screen and a projector in operative relation therewith.

Fig. 11 is a top plan view of a rotatable circular screen having radial corrugations.

Fig. 12 is a front or elevational view of the screen of Fig. 11.

Fig. 13 is a front or elevational view of the screen of Fig. 10.

Fig. 14 is a perspective view of a fragment of the screen of Figs. 11 and 12.

Fig. 15 is a perspective view of a fragment of the screen of Figs. 10 and 13.

Fig. 16 shows the filter used with the camera when the circular screen of Figs. 11 and 12 is to be used.

In the embodiment shown in Figs. 1 to 8, the usual camera 1 (Fig. 8) is shown as provided with extension 2 for supporting and housing prisms 3 arranged as shown in Figs. 2 and 3 to throw rays of light from an object through lens 4 and filter 5 having vertical lines 5ª onto exposures 6 of film 7. The prisms are located about two and one-half inches apart (the normal distance between the average person's eyes) so as to throw two almost completely superimposed images 8 and 9 upon the film (see middle exposure in Fig. 6). The filter plate is preferably a transparent and light transmitting film with a multiplicity of fine vertical lines thereon which cast their shadow on the film. Dots, crescents, spirals or other pattern may be used instead of the vertical lines if desired, and other transparent and light transmitting substances such as Cellophane or glass may be used, as may even a set of suitably spaced wires, etc.

After being developed the film is projected through the usual projector upon a mirror 11 or reflecting surface which reflects the picture or image onto a screen 12 having lines 13 which correspond exactly to the lines 5ª of the filter 5. I have found that placing a sheet of linen, silk or the like or a pane of ground glass, shown at 14, between the mirror and projector will assist the stereoscopic effect. The picture is viewed from the side of the screen opposite that on which the picture is projected as distinguished from the same side, as is usual with moving pictures.

Excellent results have also been obtained by placing the prisms 3 in a movable support 15 (Fig. 7) secured at 16 to rack 17 geared to pinion 18 located in part 20 of extension 2 and operated by shaft 19 of motor (not shown). In this construction the motor rotates pinion 18 to move rack 17 and the prisms support 15 back and forth in a horizontal plane whereby first one prism transmits rays from the object, then both, as in Figs. 2 and 3, then the other prism. In this construction every other exposure will be a single exposure 21 (see Fig. 6) and the remainder will be superimposed as in the middle exposure in Fig. 6. The motor preferably operates at such a speed as to move the prisms back and forth four full movements a second as compared to the usual sixteen per second movement of the film exposures. However, I place no limitation on the movement or the time relationship between the movement of the film and the prisms. Other relationships such as 2—1, etc., may be employed.

In the embodiment shown in Fig. 9, the prisms are not used but the camera is eccentrically mounted on cranks 21ª on support 22 and these cranks rotated through suitable gearing by motor 23 to move the camera through a cyclical path having a range of movement of about two and one-half (2½) inches. The filter 5 is still used but the movement of the camera places the lens in different positions so that the same effect as the device of Fig. 7 is obtained except that there are no overlapping superimposed exposures. The camera is preferably rotated so as to complete its cycle four times per second so that on each sixteen exposures there will be four right exposures, four left exposures, and eight intermediate exposures, but other timing relationships may be used.

Figs. 10–15 show devices which may be used with the present projector booths. The projector throws the picture at screen 24 having corrugations 25 and 26, the first being white and the second black, the screen being mounted on rollers or sprockets 27, one of which is rotated by motor 28 through belt or belts 29 and the other of which is mounted to rotate freely. This arrangement causes the screen to move continuously in one direction. The movement of the screen and the alternately black and white corrugations serve to de-emphasize or absorb the pattern and give the desired relief effect.

In Figs. 10, 13 and 15 is shown a screen adapted for use with a film employed with the filter of Figs. 1–9. In Figs. 11, 12 and 14 is shown a screen adapted for use with a film having a spiral pattern thereon caused by using the spiral filter 30 (Fig. 16) in place of the straight-line filter 5. With this film the circular screen 31 is placed in or connected to a housing or support 32 which is rotated through suitable gearing by motor 33. Screen 31 is radially corrugated and is provided with black and white spiral design 34 exactly corresponding to the design of filter 30. As shown the white and black lines of the spiral design are equal in width but they may be of other proportions if desired. The spiral filter may be stationary or, if desired, may be made to revolve in any well-known manner and any desired ratio with the movement of the film and screen.

Having thus disclosed the invention,

I claim:

1. A stereoscopic moving picture assembly comprising a film each exposure of which was taken through a filter of a certain design, a single projector a corrugated screen spaced from and in front of the projector for reflecting light from the projector and having a design corresponding to the design of the film and means for moving the screen continuously in one direction.

2. A stereoscopic moving picture assembly comprising a film each exposure of which was taken through a filter of a spiral design, a single projector a circular corrugated screen spaced from and in front of the projector for reflecting light therefrom and having a spiral design corresponding to the design of the film and means for revolving the screen.

3. A stereoscopic moving picture assembly comprising a film each exposure of which was taken through a revolving filter of a spiral design, a single projector a circular corrugated screen spaced from and in front of the projector for reflecting light therefrom and having a spiral design corresponding to the design of the film, and means for revolving the screen at the same speed as the filter.

4. A stereoscopic moving picture assembly comprising a film each exposure of which was taken through a lined filter, a single projector, a corrugated screen spaced from and in front of said projector, one side of each corrugation being black to correspond to the lines of said filter.

5. A stereoscopic moving picture assembly comprising a film each exposure of which contains a certain design thereon, a single projector a screen having corrugations at angles of about 45° to the plane of the screen and having a design corresponding to the design on the film and means for moving said screen continuously in the same direction and at a speed whereby the design on the screen will absorb the design on the film and provide a stereoscopic effect.

VICTOR GLANZ.